United States Patent
Locklear et al.

(10) Patent No.: US 6,754,747 B2
(45) Date of Patent: Jun. 22, 2004

(54) SYSTEM AND METHOD FOR CONFIGURING AN I/O BUS

(75) Inventors: David A. Locklear, Austin, TX (US); Michael A. Wright, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 479 days.

(21) Appl. No.: 09/769,799

(22) Filed: Jan. 25, 2001

(65) Prior Publication Data

US 2002/0099875 A1 Jul. 25, 2002

(51) Int. Cl.⁷ .............................................. G06F 13/00
(52) U.S. Cl. ...................................... 710/100; 710/107
(58) Field of Search .............................. 710/47, 33–52, 710/57, 58, 109, 100, 107, 113, 154, 323, 305; 713/2, 600

(56) References Cited

U.S. PATENT DOCUMENTS

| | | | |
|---|---|---|---|
| 5,179,670 A | 1/1993 | Farmwald et al. ........... 395/325 |
| 5,329,621 A | 7/1994 | Burgess et al. ............. 395/325 |
| 5,465,346 A | 11/1995 | Parks et al. ................. 395/296 |
| 5,533,205 A | 7/1996 | Blackledge, Jr. et al. ... 395/297 |
| 5,689,691 A | 11/1997 | Mann ......................... 395/557 |
| 5,727,208 A | 3/1998 | Brown ........................ 395/653 |
| 5,740,380 A | 4/1998 | LaBerge et al. ............ 395/287 |
| 5,742,847 A | 4/1998 | Knoll et al. ................. 395/866 |
| 5,778,194 A | 7/1998 | McCombs ................... 395/280 |
| 5,862,369 A | 1/1999 | Parks et al. ................. 395/558 |
| 5,968,147 A | 10/1999 | Polfer et al. ................. 710/52 |
| 6,018,803 A | 1/2000 | Kardach ...................... 713/323 |
| 6,122,693 A | 9/2000 | Gutta et al. ................. 710/107 |
| 6,145,040 A | 11/2000 | La Berge et al. ........... 710/107 |
| 6,163,824 A | 12/2000 | Quackenbush et al. ..... 710/100 |
| 6,266,723 B1 * | 7/2001 | Ghodrat et al. ............. 710/100 |
| 6,295,568 B1 * | 9/2001 | Kelley et al. ............... 710/305 |
| 6,425,079 B1 * | 7/2002 | Mahmoud ...................... 713/2 |

OTHER PUBLICATIONS

U.S. Pending patent application Ser. No. 09/637,039 entitled "System and Method for Cabling Computing Equipment" filed by Hsieh et al and assigned to Dell Products L.P. (DC–02474) filed Aug. 10, 2000.

U.S. Pending patent application Ser. No. 09/637,645 entitled "A System and Method for Virtual Setup and Configuration for a Build–to–Order Computer" filed by Eynon et al. and assigned to Dell Products L.P. (DC–02378) filed Aug 14, 2000.

* cited by examiner

*Primary Examiner*—Khanh Dang
(74) *Attorney, Agent, or Firm*—Baker Botts L.L.P.

(57) ABSTRACT

A system and method are provided for configuring an I/O bus. The system and method includes a plurality of adapter cards. A plurality of adapter card slots associated with the I/O busses receive the adapter cards into the computer. A user initiates optimization to check for configuration optimization problems and more specifically to check the placement of the adapter cards within the adapter card slots of the I/O busses. The user initiates optimization and in turn activates the improvement engine within the computer. The improvement engine analyzes the data transfer rates of the I/O busses and adapter cards and the placement of the adapter cards to determine an improved configuration of the adapter cards within the I/O busses. Indicators located proximate to the I/O busses display visual indication regarding the adapter card placement within the I/O busses allowing the user to determine if the configuration can be improved.

23 Claims, 4 Drawing Sheets

SYSTEM AND METHOD FOR CONFIGURING AN I/O BUS

TECHNICAL FIELD

This disclosure relates in general to a field of computer configurations, and more particularly to a system and method for configuring an input/output bus.

BACKGROUND

Personal computers and servers are generally designed with multiple input/output (I/O) busses with the I/O busses accommodating one or more plug-in adapter cards. An I/O bus is the data path on a computer's motherboard that interconnects the microprocessor with adapter cards in expansion or adapter card slots and allows the adapter cards to access the microprocessor and memory. The plug-in adapter cards allow for easy installation of added capabilities such as video, audio, and communications. The I/O bus allows for data to be exchanged between the computer processor and the peripheral and regulates the speed at which data is exchanged.

As the specifications for I/O busses have evolved, I/O busses support higher date transfer rates. In order to take advantage of the higher data transfer rates, both the I/O busses and the adapter cards must support the higher data transfer rates. However to support compatibility with older adapter cards that do not support the higher data transfer rates, an architected method exists whereby the I/O bus and the adapter card negotiate for the highest supported data transfer rate. Therefore to accommodate slower adapter cards, an I/O bus with multiple adapter card slots transfers data at a data transfer rate equal to the slowest adapter card on the I/O bus. If a user adds an adapter card to a bus already containing an adapter card and the adapter cards are of varying data transfer rates, then performance of the computer system suffers because the two adapter cards will not operate at each card's maximum data transfer rate but instead at the slower of the two maximum data transfer rates of the adapter cards.

A similar problem also occurs when multiple adapter cards of the same data transfer rate are located on one I/O bus when there are unoccupied I/O busses available in the computer system. Because the adapter cards operate at the same data transfer rate, the adapter cards will operate at their maximum data transfer rate. But the adapter cards have to share the total available bandwidth of the single I/O bus while the other I/O busses go unused or underused. Thereby the computer system does not operate as efficiently as it could if the adapter cards were located on separate I/O busses.

Because adapter cards and I/O busses auto-negotiate the data transfer rate to accommodate slower adapter cards on the same I/O bus, many users are not operating their computer systems at optimal or efficient levels. But configuring a computer system to operate at an optimal or even improved level is a difficult task for a majority of users. Improving the configuration of computer systems typically involves running a diagnostic on the system by someone having some degree of knowledge with computers. Indeed, even recognition that a configuration needs improving generally involves a degree of expertise. Moreover, improving a configuration requires the user to consult the user's manual on how best to configure adapter cards to achieve optimum or improved performance. If a user upgrades or has third party components within the computer system, then the user must also obtain the performance specifications for those third party components in order to improve the configuration. Therefore, improving a configuration is neither an intuitive task nor a user friendly task. Also, consumers who spend extra money to purchase advanced computer systems often do not know if the configuration is operating suboptimally and therefore may not get as good a return as they should on their investment in the computer system.

Another difficulty in improving a configuration is that telephone servicing and technical support of computer systems for configuration problems is difficult. Non-optimized configurations cause problems in a computer system but most users are unaware that the placement of adapter cards can cause configuration problems as well as other problems. Trying to determine over the telephone the problem with a computer system is a difficult task even when the user has an idea of the problem. And without being able to physically see the computer system, the technical support staff has a hard time fixing a configuration optimization problem without the user having at least some knowledge of I/O busses and adapter cards.

SUMMARY

Therefore, a need has arisen for a system and method that visually indicates configuration problems and solutions for I/O busses.

A further need has arisen for a system and method that allows a user to achieve an optimal or improved configuration without specialized knowledge.

A further need has arisen for a system and method that allows for the servicing of configuration problems over the telephone.

In accordance with teachings of the present disclosure, a system and method are described for configuring an I/O bus which substantially eliminates or reduces disadvantages and problems associated with previous systems and methods. The system and method allows for an intuitive and uncomplicated way for a user to recognize and resolve I/O bus or adapter card configuration optimization problems.

In accordance with one aspect of the present disclosure, a system and method provides visual indication of I/O bus configuration optimization problems and solutions. A computer has a plurality of adapter cards. A user inserts the adapter cards into adapter card slots interfaced with the I/O busses of the computer. The user presses an optimization switch, located on the computer, to check the current adapter card configuration. Pressing the optimization switch activates an improvement engine within the computer to analyze the I/O busses and the adapter cards to determine an improved configuration of the adapter cards within the adapter card slots of the I/O busses. Indicators located on the computer and proximate to the adapter card slots display visual indication on whether or not the adapter card placement within the I/O busses is an optimal configuration.

More specifically, the improvement engine detects the data transfer rates for the adapter cards and the transfer rate capabilities of the I/O busses. When the user initiates optimization, the improvement engine analyzes and compares the data transfer rates of the installed adapter cards with the transfer rate capabilities of the I/O busses to determine if any of the installed adapter cards limit the I/O bus transfer rates. If an adapter card limits an I/O bus transfer rate, the improvement engine activates the indicator associated with the adapter card slot of the I/O bus receiving the adapter card to visually indicate that this particular adapter card limits the I/O bus transfer rate. In addition, the improvement engine determines where the limiting adapter card should be placed within the plurality of I/O busses so that the adapter card has a reduced impact on the I/O bus transfer rate. The improvement engine also activates the indicator associated with the adapter card slot of the I/O bus where the adapter card should be placed so as to improve the I/O bus transfer rate. Therefore, the user can see what adapter card limits the transfer rate and where to move the adapter card to improve the configuration.

The present disclosure provides a number of important technical advantages. One important technical advantage is that the system and method provides to the user visual indication regarding configuration optimization problems. The visual indication allows a user to recognize and improve upon the optimization problems. Even users who would never think to check their computer's configuration of adapter cards within the adapter card slots or suspect a configuration problem can now get a visual indication of a configuration problem by initiating optimization. In addition, the ability to visually recognize and correct configuration problems adds value to users' computers because users know that their system is running at an optimal level where before they typically did not even know that they had a problem. Therefore, users get their money's worth from their computers as well as any high dollar adapter cards installed in the computer.

Another important technical advantage of the present disclosure is that recognizing and correcting I/O bus adapter card slot configuration optimization problems is an intuitive and user friendly task. A user with little computer knowledge can quickly test for a configuration optimization problem by activating optimization and if a non-optimal I/O bus adapter card slot configuration problem exists, quickly correct it by making any recommended changes. The user can check the configuration immediately after power up and prior to booting the operating system and running any management software. Therefore, any configuration problems are discovered and resolved quickly. Users no longer have to consult user's manuals or search for the specifications for third party components in order to be able to recognize and correct configuration optimization problems. In addition, users can upgrade their systems without worrying about changing an otherwise optimized configuration because activating optimization tells the users if they have optimally installed a new adapter card.

Another important technical advantage of the present disclosure is that it simplifies servicing by telephone. If a technical support staff suspects that an I/O bus adapter card slot configuration problem causes a user's overall problem, the technical support staff can tell the user to activate optimization and the user can quickly report back to the technical support staff what the indicators display. The technical support staff can determine if there is an optimization configuration problem from what the indicators display. Therefore, users unaware of configuration problems, adapter cards, and I/O busses and having problems associated with any of these items can have these problems adequately addressed with servicing over the telephone.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

Figure 1:
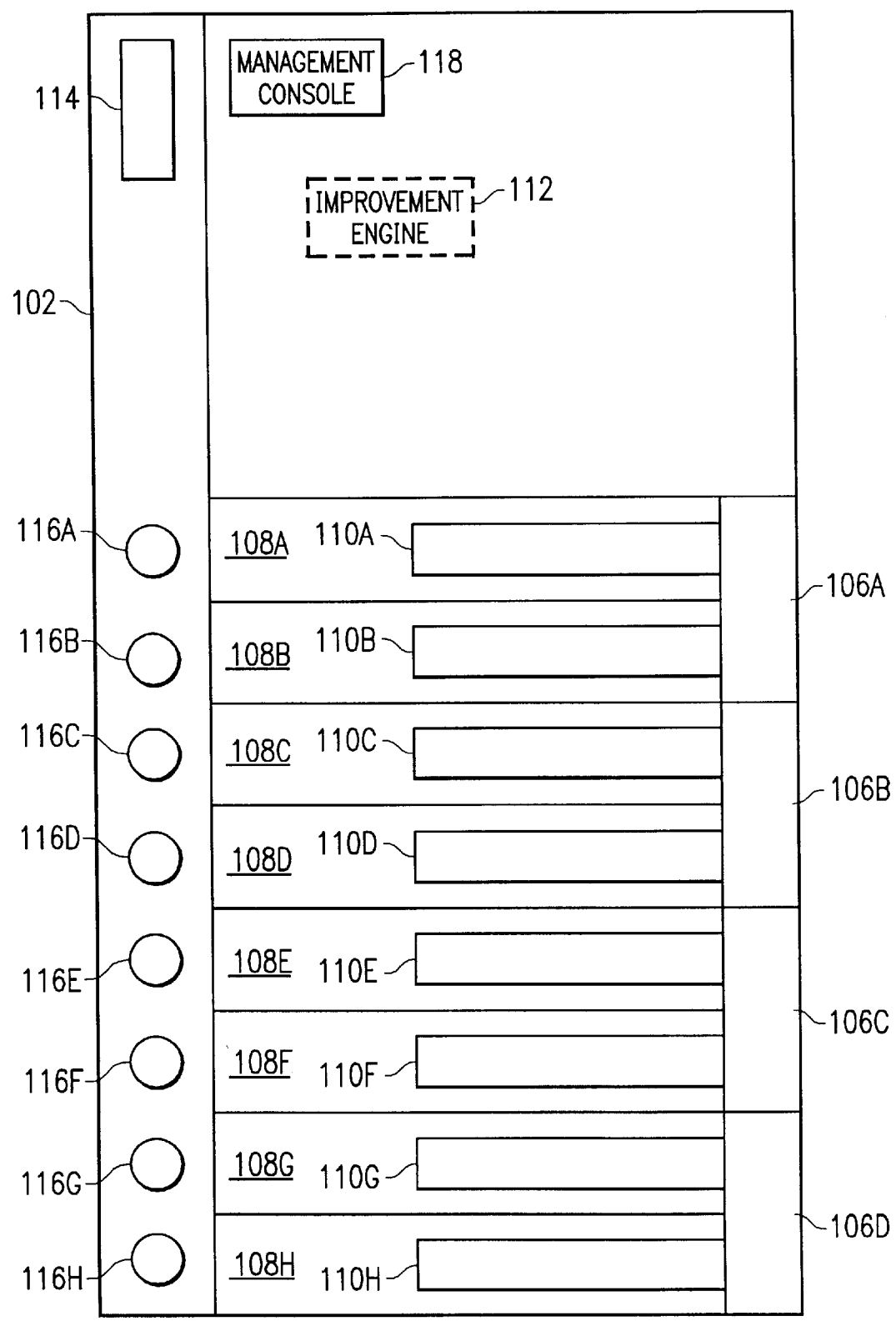
FIG. 1 depicts a block cutaway diagram of the hardware components for the visual indication of I/O bus adapter card slot configuration optimization problems and solutions system for a server.

FIG. 1 depicts a block cutaway diagram of the rear view of the hardware components for the visual indication of I/O bus adapter card slot configuration optimization problems and solutions system for server 102.

Server 102 has four input/output (I/O) busses: I/O bus 106A, I/O bus 106B, I/O bus 106C, and I/O bus 106D. In alternative embodiments, server 102 may contain more than four or less than four I/O busses. I/O busses 106 contain two adapter card slots 108 per I/O busses 106. I/O bus 106A contains adapter card slots 108A and 108B, I/O bus 106B has adapter card slots 108C and 108D, I/O bus 106C contains adapter card slots 108E and 108F, and I/O bus 106D has adapter card slots 108G and 108H. In alternative embodiments, I/O busses 106 may contain less than two or more than two adapter card slots per bus.

I/O busses 106 comprise peripheral component interconnect (PCI) bus type, peripheral component interconnect extended (PCI-X) bus type, or any other appropriate bus type. The PCI-X bus type allows server 102 to support new PCI-X cards as well as PCI adapter cards. PCI-X is a newer bus technology that increases the data transfer rate from 66 MHz, the maximum for PCI busses, to 133 MHz. In addition, PCI-X is also backwards compatible and therefore allows server 102 to run PCI adapter cards in a PCI-X bus.

Adapter card slots 108, associated with I/O busses 106, accept adapter cards 110. The type of adapter cards 110 that server 102 accepts include adapter card types such as PCI and PCI-X. In addition, adapter cards 110 increase the capabilities of server 102 by adding such functions as RAID controllers, video adapters, graphic accelerators, sound cards, modems, accelerator boards, LAN cards (such as 10/100 MBs Ethernet network interface cards), SCSI cards, and WAN cards. Each of the adapter card slots 108 receives one of the adapter cards 110. Adapter card slot 108A receives adapter card 110A, adapter card slot 108A receives adapter card 110B, adapter card slot 108C receives adapter card 110C, adapter card slot 108D receives adapter card 110D, adapter card slot 108E receives adapter card 110E, adapter card slot 108F receives adapter card 110F, adapter card slot 108G receives adapter card 110G, and adapter card slot 108H receives adapter card 110H.

Improvement engine 112, associated with I/O busses 106 and server 102, operates to improve the placement of adapter cards 110 within I/O busses 106. Improvement engine 112 is a programmable logic device or ASIC that is designed for the special application of recognizing configuration optimization problems and providing configuration optimization solutions. Alternatively, improvement engine 112 may be implemented as software on a microprocessor. Improvement engine 112 is built into the system board of server 102 and detects the maximum capable data transfer rates of both adapter cards 110 and I/O busses 106. Improvement engine 112 detects or the specific I/O architecture of server 102 including which adapter card slots 108 are associated with I/O busses 106. In addition, improvement engine 112 also detects the transfer rate capabilities of I/O busses 106. Improvement engine 112 also detects the maximum transfer capabilities of adapter cards 110 by sampling signals on the interface of adapter cards 110 as defined by the I/O bus architecture. Improvement engine 112 determines when the inclusion of an adapter card 110 on a certain I/O bus 106 brings down the bus transfer rate and consequently negatively impacts the data transfer rates of the other adapter card 110 on the particular I/O bus 106. For example, if adapter card 110A operates at 100 MHz and adapter card 110B operates at 66 MHz, adapter card 110B limits the operation of adapter card 110A to 66 MHz since adapter cards 110A and 110B are on the same I/O bus 106A and must operate at the same speed. In addition, improvement engine 112 also determines if another adapter card slot 108 within server 102 is an improved location for adapter card 110 in order to prevent performance and optimization problems.

Optimization switch 114, associated with improvement engine 112 and server 102, allows the user servicing or configuring server 102 to request visual indication on the current adapter card 110 configuration. In order to provide visual indication, server 102 takes advantage of indicators 116A through 116H associated with adapter card slots 108 and I/O busses 106. Indicators 116 are bicolor, light emitting diodes (LED). Server 102 typically uses indicators 116 for PCI hot plug identification so that when not testing for optimization, indicators 116 provide an indication to the user of server 102 on whether an adapter card 110 within adapter card slot 108 is powered, failed, or ready for a hot plug operation. When the user depresses optimization switch 114, indicators 116 convert from their PCI hot plug system identification function and instead are used to indicate the optimization of the placement of adapter cards 110 within the adapter card slots 108 and I/O busses 106. Each indicator 116 is associated with a single adapter card slot 108 and returns visual indication only for the adapter card 110 in that adapter card slot 108. For example, indicator 116A returns optimization information regarding adapter card 110A, indicator 116B returns information regarding adapter card 110B and so forth.

Indicators 116 denote four different states in relation to adapter card slots 108. Indicator 116 unlit indicates that no adapter card is present within adapter card slot 108. Indicator 116 that is a steady green indicates that adapter card 110 located in adapter card slot 108 does not limit the data transfer rate. Indicator 116 flashing amber indicates that adapter card 110 located in that adapter card slot 108 limits the bus transfer rate causing the configuration to not be optimized. Indicator 116 flashing green gives the indication of where the adapter card 110 limiting the configuration should be moved in order to improve the data transfer rate.

If the configuration cannot be improved there will be no indicators 116 flashing green, and the user can access and bring up management console 118, associated with improvement engine 112, to view details regarding the status of the configuration of adapter cards 110 within adapter card slots 108.

Figure 2:
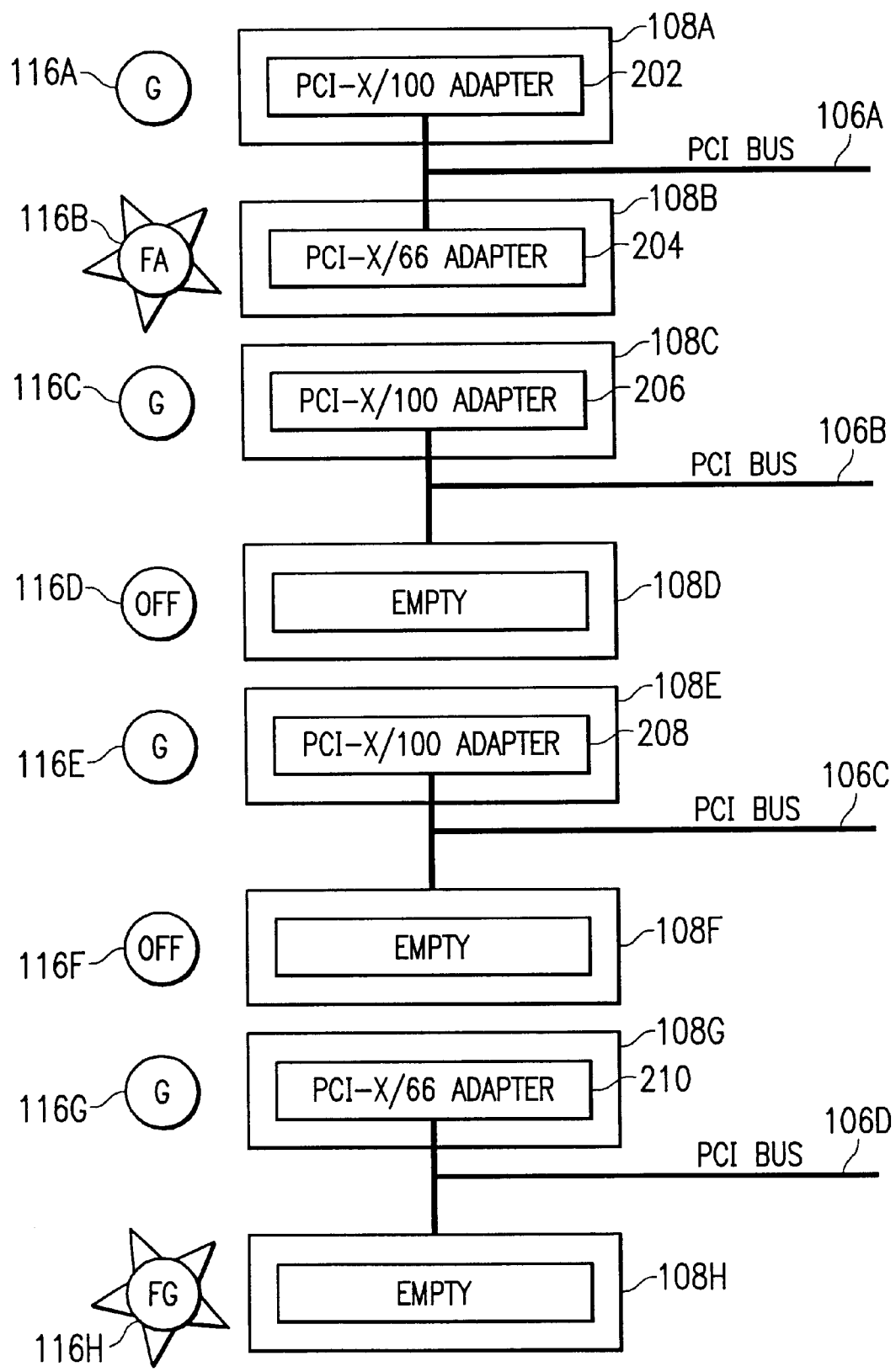
FIG. 2 depicts a block diagram of the indicators, adapter cards, adapter card slots, and I/O busses of the system shown in FIG. 1.

FIG. 2 depicts a block diagram of indicators 116, adapter card slots 108, and I/O busses 106 of server 102 shown in FIG. 1. Server 102 contains four independent I/O busses 106 with two adapter card slots 108 per I/O bus 106. For exemplary purposes, all four I/O busses 106 are shown in FIG. 2 as PCI-X busses with two adapter card slots 108 per bus and support adapter cards running at 100 MHz, 66 MHz and 33 MHz.

FIG. 2 shows a 100 MHz adapter card 202 plugged into adapter card slot 108A, a 66 MHz adapter card 204 plugged into adapter slot 108B, a 100 MHz adapter card 206 plugged into adapter card slot 108C, a 100 MHz adapter card 208 plugged into adapter card slot 108E, and a 66 MHz adapter card 210 plugged into adapter card slot 108G. Adapter card slots 108D, 108F, and 108H do not contain any adapter cards and are therefore left empty.

The user of server 102 desires to check to see if the configuration of the adapter cards 202, 204, 206, 208 and 210 is an optimal configuration. Therefore, the user depresses optimization switch 114. When the user presses optimization switch 114, improvement engine 112 detects whether or not an adapter card 110 is in an adapter card slot 108, and then determines the data transfer rates of adapter cards 202 through 210 and the I/O busses 106.

When the user presses optimization switch 114, indicators 116 produce visual indication regarding configuration optimization. Indicators 116D and 116F remain a steady off because adapter card slots 108D and 108F have no adapter cards. Indicators 116A, 116C, 116E, and 116G are steady green indicating that adapter cards 202, 206, 208, and 210, respectively, do not limit the data transfer rate. Indicator 116B flashes amber indicating that adapter card 204 limits the data transfer rate of bus 106A. Adapter card 204 limits the data transfer rate of I/O bus 106A because both adapter card slots 108A and 108B have adapter cards present. Since adapter cards 202 and 204 are on the same bus, adapter cards 202 and 204 must operate at the same clock speed. Adapter card 204 limits adapter card 202 because the maximum speed of 66 MHz of adapter card 204 limits the 100 MHz adapter card 204 to 66 MHz instead of its maximum speed of 100 MHz. Adapter card 204 limits adapter card 202 because adapter card 202 cannot operate at its optimal data transfer rate.

The configuration can be improved and indicator 116H displays this. Indicator 116H flashes green indicating that the user should move adapter card 204 to adapter card slot 108H in order to no longer limit the data transfer rate of I/O bus 106A. Adapter card slot 108H is the ideal location for adapter card 204 because adapter card slot 108G already contains adapter card 210 running at 66 MHz. Adapter card 210 and adapter card 204 run at the same maximum clock speed, 66 MHz, and therefore adapter cards 204 and 210 operate at an optimum level and I/O bus 106D operates at an optimal data transfer rate. Once the user moves adapter card 204 from adapter card slot 108B to adapter card slot 108H and activates optimization switch 114, all indicators associated with adapter card slots 108 containing an adapter card are a steady green indicating that the configuration is optimized.

If the configuration cannot be optimized, indicators 116 show which adapter cards limit the configuration by flashing amber but not indicating an improved adapter card slot 108 location to switch the adapter card to. At this point, the user brings up management console 118 for more details on the configuration problem.

Figure 3:
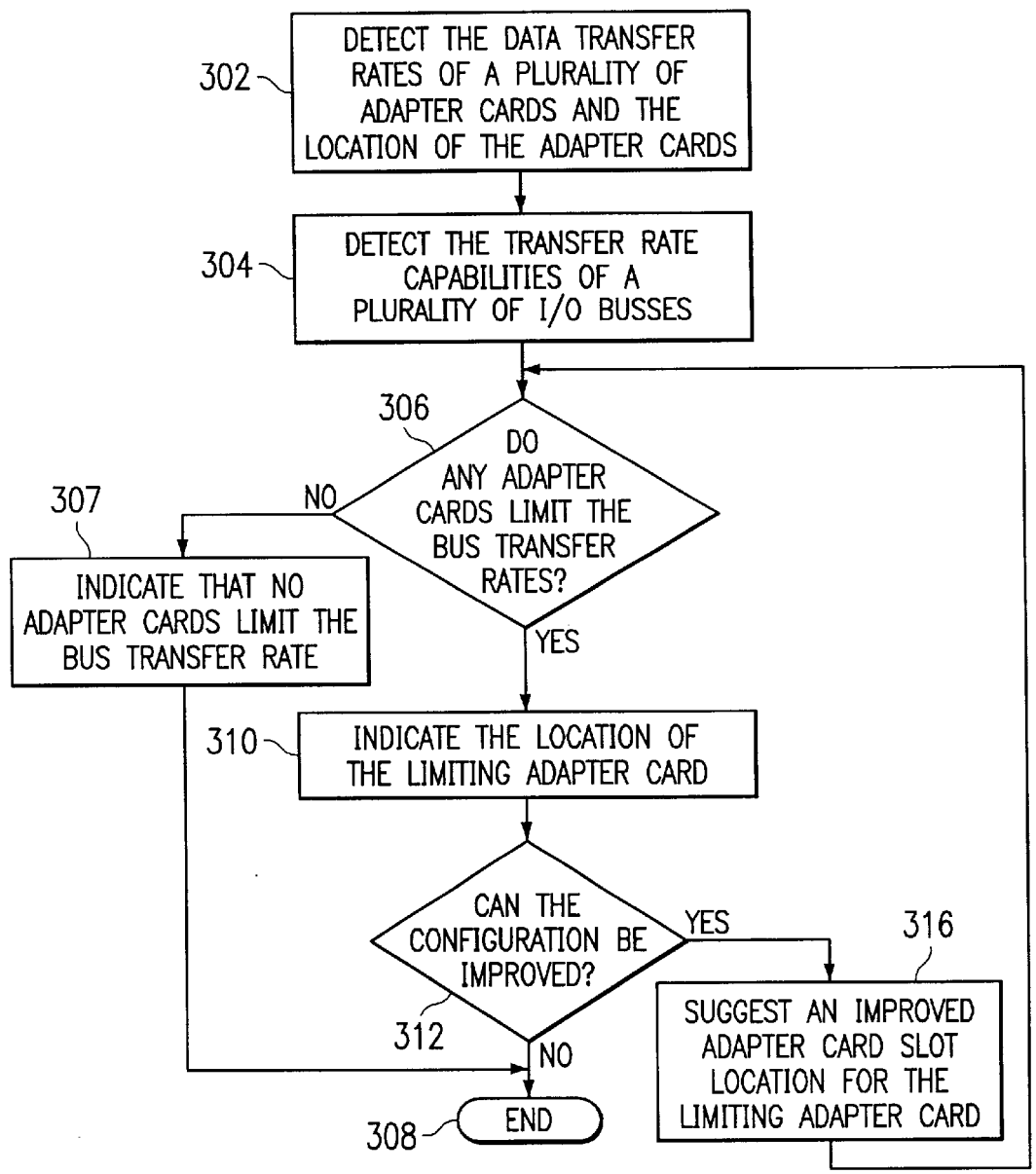
FIG. 3 depicts a flow diagram for improving the configuration of adapter cards.

FIG. 3 depicts a flow diagram for improving the configuration of adapter cards 110. In step 302, improvement engine 112 detects the data transfer rates of adapter cards 110 and also detects the location of adapter cards 110 within adapter card slots 108. In step 304, improvement engine 112 detects the transfer rate capabilities of I/O busses 106.

Comparing and analyzing data transfer rates of adapter cards 110 with transfer rate capabilities of I/O busses 106, improvement engine 112 determines whether any of adapter cards 110 limit the other adapter cards 110 located on the same I/O bus 106 in step 306. If none of the adapter cards 110 limit the bus transfer rates, then in step 307 indicators 116 all flash green indicating that no adapter cards 110 limit the bus transfer rate. Therefore, the configuration cannot be improved upon, the user needs not act, and the process ends in step 308. But if one or more adapter cards 110 limits the data transfer rates of other adapter cards 100 on I/O busses 106, then in step 310, improvement engine 112 determines a single adapter card 110 that limits the configuration. The process indicates one limiting adapter card 110 at a time in order to simplify the process for the user. Indicators 116 indicate the adapter card 110 that limits the configuration by flashing amber. After determining that the configuration is not optimized, in step 312 improvement engine 112 determines whether or not the configuration can be improved. If the configuration cannot be improved, improvement engine 112 does not suggest an adapter card slot 108 location for the limiting adapter card 110 and the process ends in step 308.

But if in step 312 improvement engine 112 determines that the configuration can be improved, then in step 316 improvement engine 112 suggests an improved adapter card slot 108 location for adapter card 110 limiting the configuration by having indicator 116 flashing green for adapter card slot 108 location where the user should move adapter card 110 limiting the configuration. Once the user moves adapter card 110 limiting the configuration to the improved adapter card slot 108 location, improvement engine 112 again checks in step 306 to determine if any adapter cards 110 limit the data transfer rate. If no adapter cards 110 limit the data transfer rate in step 306, then the configuration is optimized and the process ends in step 308. If the configuration is still not optimized, the process repeats until the configuration is optimized or improvement engine 112 determines that moving additional adapter cards 110 will not affect the limited data transfer rate.

Figure 4:
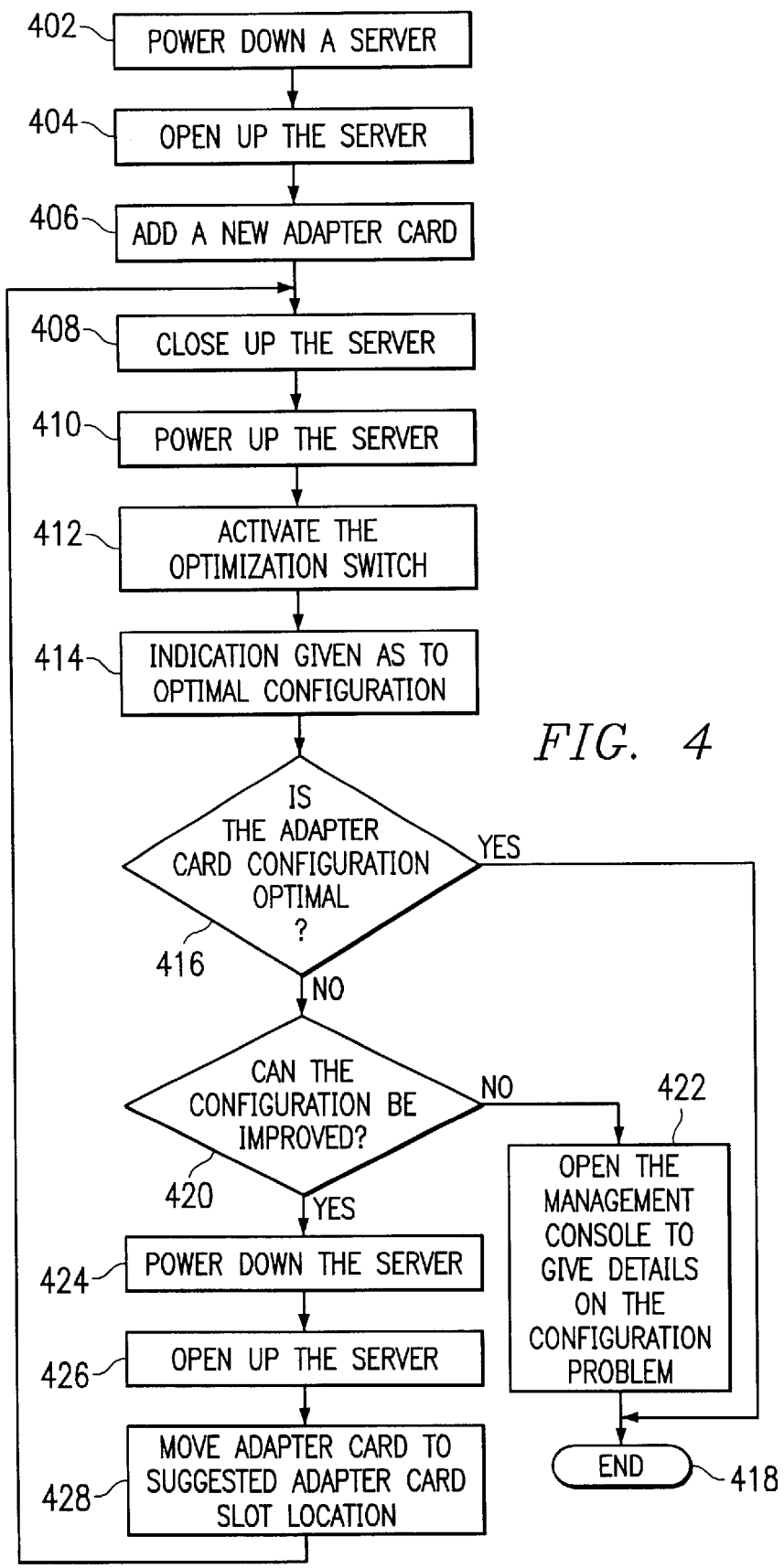
FIG. 4 depicts a flow diagram for employing the system and method to visually indicate configuration optimization problems and solutions.

FIG. 4 illustrates a flow diagram for how a user employs the system and method for visually indicating configuration optimization problems and solutions. FIG. 4 depicts the process for when a user wants to add a new adapter card to a pre-existing configuration but the process also applies to configurations where a user is not adding any new adapter cards but only wants to check for optimization.

In step 402, the user powers down server 102 and in step 404 the user opens up server 102 in order to access adapter card slots 108. In step 406, the user adds a new adapter card 110. The user closes up server 102 in step 408 and powers up server 102 in step 410.

In step 412, the user activates optimization switch 114 to request visual indication on the configuration optimization. In step 414, indicators 116 display the visual indication and give an indication to the user regarding the optimal configuration. The user reads the indication from indicators 116 in order to determine if the configuration is optimal in step 416. If indicators 116 are a combination of steady green or steady off, then the configuration is optimized and the user needs not act further and the optimization process ends in step 418.

If in step 416 indicators 116 are not all of a combination of steady green or steady off but one flashes amber, then the configuration is not optimal. So in step 420, the user must look at indicators 116 to determine if the configuration can be improved. If one of the indicators 116 flashes amber and none of the other indicators flash green, then the configuration works as well as possible. Therefore, in step 422, the user boots the operating system and brings up management console 118 to give the user details on the configuration problem. But if in step 420 the configuration can be improved, then one of the indicators 116 flashes amber while another of the indicators 116 flashes green. Therefore, the user will know where to move the identified adapter card 110 so that its limitation is minimal. In step 424 the user powers down server 102 and in step 426 opens up server 102 to gain access to adapter card 110 limiting the configuration. In step 428, the user moves adapter card 110 that limits the configuration to the suggested improved adapter card slot 108 location to fix the optimization problem. The user then closes server 102 in step 408 and powers up server 102 in step 410.

If optimization requires multiple adapter card 110 moves to obtain optical performance, the process is for improvement engine 112 to indicate one adapter card 110 move at a time in order to keep the process simple and intuitive. A user employs the process as shown in FIG. 4 until the indicators 116 show that an optimal configuration is achieved. If it is not possible to configure adapter cards 110 in an optimal way, indicators 116 show which adapter card 110 limits the data transfer rate, but do not indicate a suggested adapter card slot 108 location in which to move adapter card 110 that limits the configuration. At this point, the user may access management console 118 to get details on the configuration problem.

Although the disclosed embodiments have been described with regard to adapter cards on separate I/O busses, this system and method is applicable to any adapter card configuration problem that limits performance. For example, if two adapter cards are on the same bus while all other busses are left empty, then the data transfer rate of the I/O bus is potentially limited even if the adapter cards operate at the same maximum clock speed. The system and method address this limitation and indicate that the two adapter cards be on separate busses so that they no longer share the limited bandwidth of a single I/O bus, but have their own full amount of bandwidth on their own separate I/O bus. Therefore, there is less unused bandwidth allowing for improved performance. In addition, the system and method equally apply to all types of computers and not only to servers as described in the disclosed embodiment above.

Although the disclosed embodiments have been described in detail, it should be understood that various changes, substitutions and alterations can be made to the embodiments without departing from their spirit and scope.

What is claimed is:

1. A computer system comprising:
   a plurality of adapter cards operable to interface with the computer system;
   a plurality of adapter card slots interfaced with the adapter cards, the plurality of adapter card slots operable to receive the adapter cards;
   a plurality of I/O busses associated with the adapter card slots, the plurality of I/O busses operable to interface with the adapters cards;
   an improvement engine associated with the plurality of I/O busses, the improvement engine operable to measure I/O bus performance and improve the placement of the adapter cards within the plurality of adapter card slots to optimize I/O bus performance; and
   a plurality of indicators associated with the plurality of adapter card slots, the indicators operable to display visual indication on the adapter card configuration.

2. The computer system of claim 1 further comprising an optimization switch associated with the plurality of I/O busses and the improvement engine, the optimization switch operable to activate the improvement engine and the indicators.

3. The computer system of claim 1 wherein the indicators comprise bi-color LED's.

4. The computer system of claim 1 wherein the indicators comprise PCI hot plug indication LED's.

5. The computer system of claim 1 wherein the plurality of I/O busses auto-negotiate the data transfer rates of the adapter cards.

6. The computer system of claim 1 wherein the improvement engine comprises a programmable logic device.

7. The computer system of claim 1 wherein the plurality of I/O busses comprises I/O busses having more than one adapter card slot.

8. The computer system of claim 1 wherein the improvement engine comprises a programmable logic device that detects the specific I/O architecture of the computer system including which adapter card slots are on the same I/O bus and the data transfer rate capabilities of the I/O busses and the adapter cards.

9. The computer system of claim 1 further comprising a management console associated with the improvement engine, the management console operable to give details on a configuration problem when the adapter card configuration cannot be improved.

10. A method for improving the data transfer rate of adapter cards, the method comprising:
    detecting the data transfer rates of a plurality of adapter cards;
    detecting the transfer rate capabilities of a plurality of I/O busses;
    determining when an adapter card limits a bus transfer rate;
    indicating the location of a limiting adapter card; and
    suggesting a less limiting adapter card location configuration to improve I/O bus performance.

11. The method of claim 10 wherein suggesting a less limiting adapter card configuration comprises suggesting an improved adapter card slot location for the limiting adapter card.

12. The method of claim 10 wherein suggesting a less limiting adapter card configuration comprises recognizing that there is not an improved adapter card configuration, and not suggesting an improved adapter card slot location for the limiting adapter card.

13. The method of claim 12 further comprising opening a management console having configuration details when an improved adapter card configuration cannot be achieved.

14. The method of claim 10 wherein determining when an adapter card limits the bus transfer rate comprises analyzing and comparing the adapter card data transfer rates, the adapter card slots, and the bus transfer rate capabilities.

15. The method of claim 10 wherein suggesting a less limiting adapter card configuration comprises determining if a different adapter card slot location provides an improved configuration.

16. The method of claim 10 wherein detecting the transfer rate capabilities of a plurality of I/O busses comprises determining which adapter card slots are on the same I/O bus.

17. The method of claim 10 wherein indicating the location of the limiting adapter card comprises flashing an LED located proximate to the limiting adapter card.

18. The method of claim 11 wherein suggesting a less limiting adapter card configuration comprises flashing an LED located proximate to the improved adapter card slot location.

19. The method of claim 10 further comprising repeating the steps of determining when an adapter card limits a bus transfer rate, indicating the location of the limiting adapter card, and suggesting a less limiting adapter card configuration until either an improved configuration is achieved or an improved configuration is not possible.

20. A method for improving an adapter card configuration within a plurality of I/O busses, the method comprising:
    adding an adapter card to the I/O busses;
    initiating a performance check;
    reading indicators to ascertain if the adapter card configuration is limiting the data transfer rate;
    moving an adapter card from a non-optimal adapter card slot location to a suggested improved adapter card slot location to improve the adapter card configuration to improve I/O bus performance.

21. The method of claim 20 wherein initiating a performance check comprises activating an optimization switch.

22. The method of claim 20 further comprising repeating the steps of initiating a performance check, reading indicators, and moving the adapter cards until an improved adapter card configuration is achieved or the indicators show that an improved adapter card configuration is not possible.

23. The method of claim 20 further comprising iteratively determining adapter card configuration improvement by checking one adapter card at a time.

* * * * *